United States Patent [19]
House et al.

[11] Patent Number: 5,613,806
[45] Date of Patent: Mar. 25, 1997

[54] SEALING SYSTEM FOR SEWER AND WATER APPLICATIONS

[75] Inventors: Jeffrey W. House, St. Croix; William K. House, Forest Lake, both of Minn.

[73] Assignee: Infi-Shield, Inc., Forest Lake, Minn.

[21] Appl. No.: 477,219

[22] Filed: Jun. 7, 1995

Related U.S. Application Data

[63] Continuation-in-part of Ser. No. 308,256, Sep. 19, 1994, Pat. No. 5,531,485, which is a continuation-in-part of Ser. No. 273,503, Jul. 11, 1994, Pat. No. 5,511,897.

[51] Int. Cl.⁶ .......................... F16L 55/162; F16L 58/10
[52] U.S. Cl. .................... 405/150.1; 405/152; 52/20; 138/97; 404/25
[58] Field of Search .................... 404/25, 26, 72; 52/19, 20; 138/97, 98; 285/45, 55, 109, 230, 915; 405/52, 133, 135, 150.1, 151, 152; 156/184, 287; 220/470, 484, 654

[56] References Cited

U.S. PATENT DOCUMENTS

| | | | |
|---|---|---|---|
| 3,065,572 | 11/1962 | Weingartner | 50/47 |
| 3,294,000 | 12/1966 | Pelsue | 94/38 |
| 3,951,173 | 4/1976 | Larson | 138/97 |
| 3,958,313 | 5/1976 | Rossborough | 29/157 R |
| 4,305,679 | 12/1981 | Modi | 404/25 |
| 4,325,572 | 4/1982 | Arntyr et al. | 285/229 |
| 4,357,961 | 11/1982 | Chick . | |
| 4,368,893 | 1/1983 | Gagas | 277/12 |
| 4,443,282 | 4/1984 | Stachitas | 285/915 X |
| 4,449,715 | 5/1984 | Gagas | 277/12 |
| 4,465,309 | 8/1984 | Nimke et al. . | |
| 4,469,467 | 9/1984 | Odill et al. | 404/25 |
| 4,475,845 | 10/1984 | Odill et al. | 404/25 |
| 4,540,310 | 9/1985 | Ditcher et al. | 404/25 |
| 4,659,251 | 4/1987 | Petter et al. | 405/52 |
| 4,712,938 | 12/1987 | Seshamani et al. | 403/24 |
| 4,737,220 | 4/1988 | Ditcher et al. | 156/218 |
| 4,756,337 | 7/1988 | Settineri . | |
| 4,759,656 | 7/1988 | Wilson | 404/26 |
| 4,796,669 | 1/1989 | St. Onge . | |
| 4,852,891 | 8/1989 | Sugiura et al. | 277/212 |
| 4,957,389 | 9/1990 | Neathery | 404/72 |
| 4,965,119 | 10/1990 | Sancaktar | 428/192 |
| 5,081,802 | 1/1992 | Westhoff et al. | 52/20 |
| 5,240,345 | 8/1993 | Gagas | 404/25 |
| 5,265,981 | 11/1993 | McNeil | 405/150.1 X |
| 5,299,833 | 4/1994 | Westoff et al. | 404/25 |
| 5,405,218 | 4/1995 | Hyde-Smith | 52/20 X |
| 5,496,128 | 3/1996 | Odill | 52/20 X |

FOREIGN PATENT DOCUMENTS

| | | |
|---|---|---|
| 2221010 | 1/1990 | United Kingdom . |
| 8800314 | 1/1988 | WIPO . |

OTHER PUBLICATIONS

*Internal Manhole Joint Seal*, Cretex Specialty Products, Date Unknown.

Primary Examiner—James A. Lisehora
Attorney, Agent, or Firm—Andrew D. Sorensen; Holland and Hart LLP

[57] ABSTRACT

A method and article for sealing a manhole riser a catch basin, and a pipe juncture. The method is an economical process whereby elastomeric bands are placed around and inside a manhole riser, a catch basin, or a pipe juncture and effectively seals the manhole riser, catch basin, or pipe juncture from loss of water or infiltration of water and other contaminants such as gases and salt.

13 Claims, 6 Drawing Sheets

FIG. 8
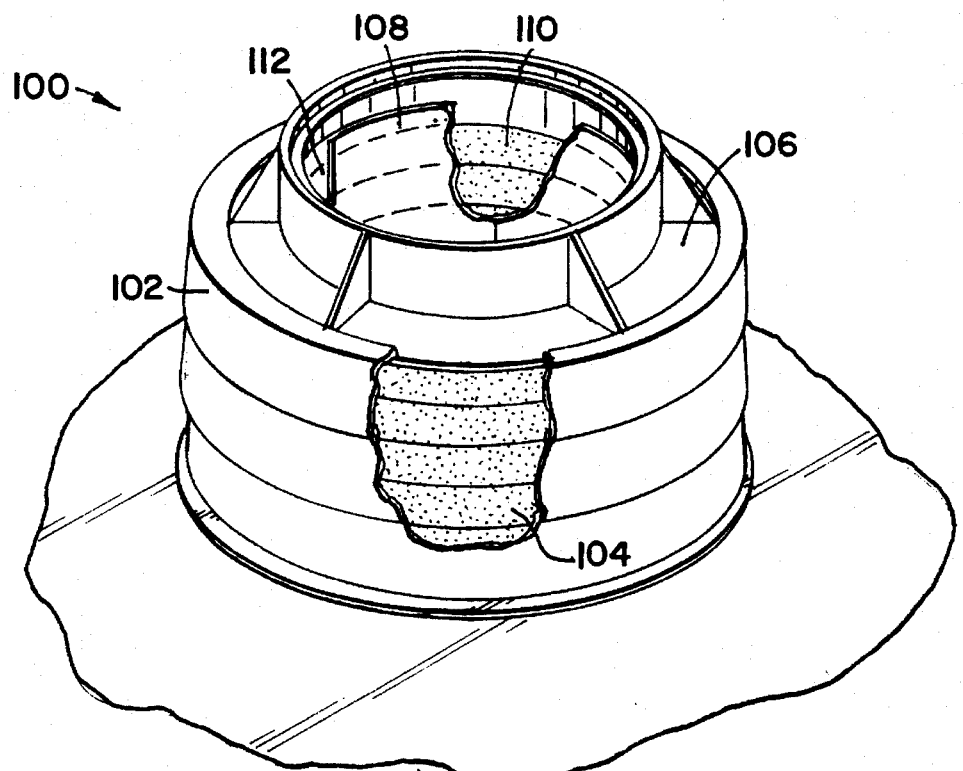
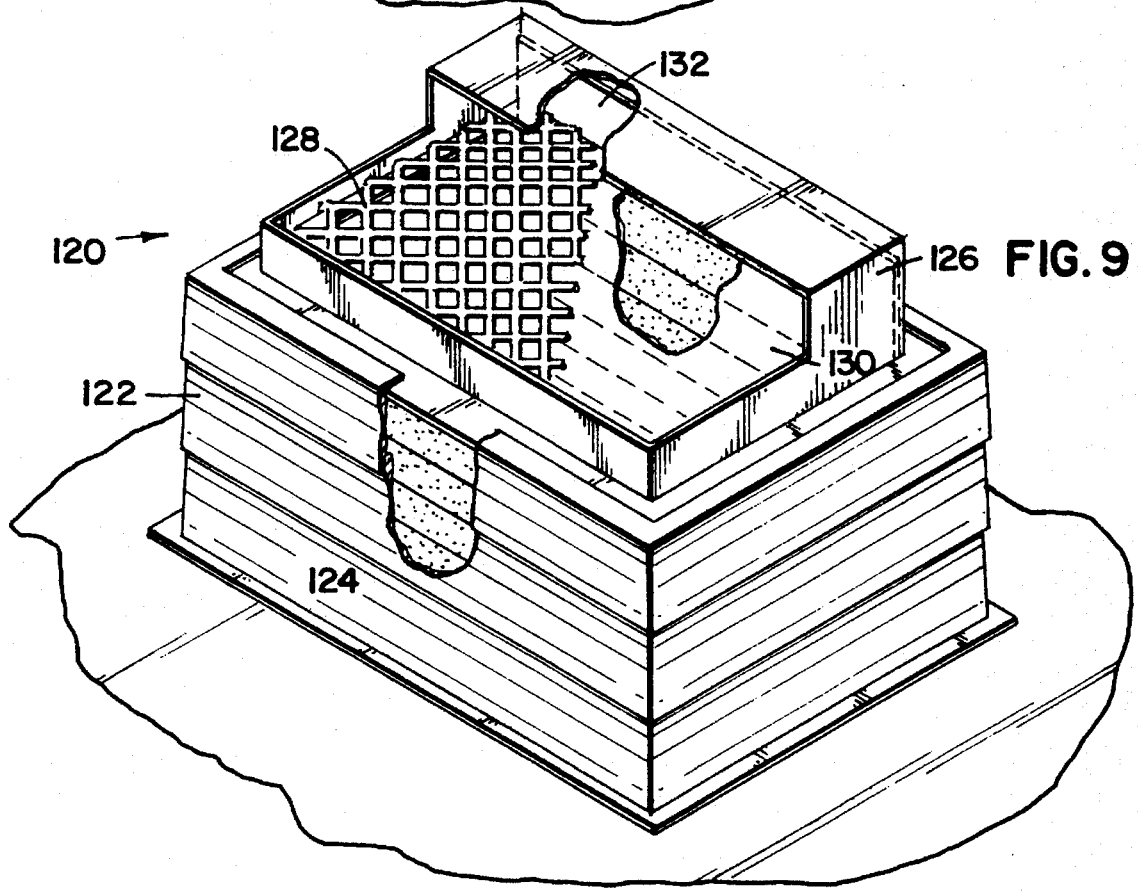
FIG. 9

FIG. 10
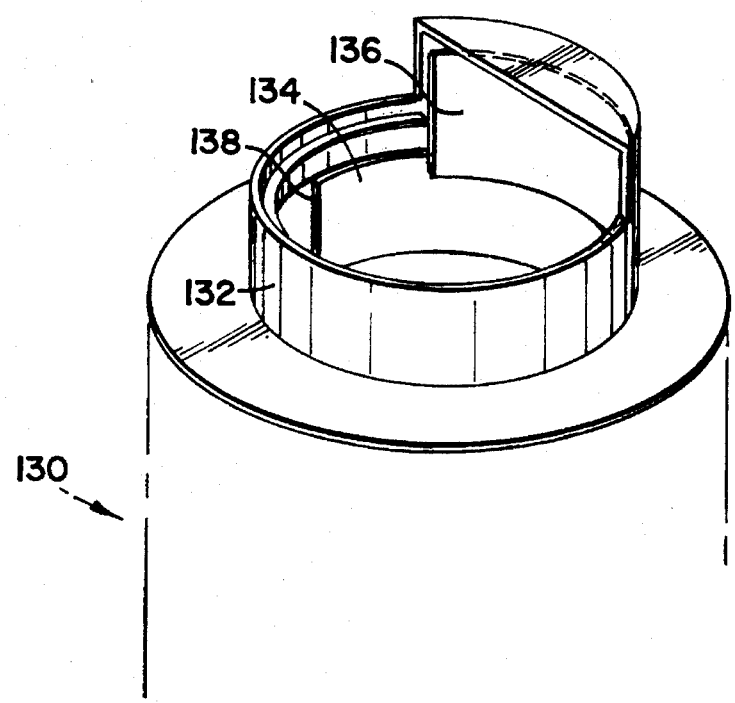
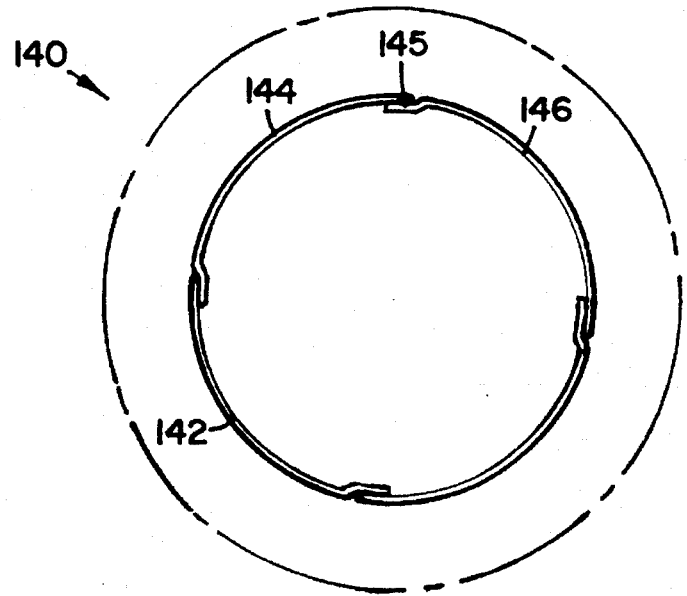
FIG. 11

5,613,806

SEALING SYSTEM FOR SEWER AND WATER APPLICATIONS

RELATED APPLICATION

This application is a continuation-in-part of Ser. No. 08/308,256, filed on Sep. 19, 1994, now U.S. Pat. No. 5,531,485, which is a continuation-in-part of Ser. No. 08/273,503, filed on Jul. 11, 1994, now U.S. Pat. No. 5,511,897.

FIELD OF THE INVENTION

The present invention relates to a method of sealing a manhole riser and a catch basin, as well as sealing storm sewer pipes. More particularly, it relates to an improved, economical method to seal a manhole riser and catch basin from unwanted water and other contaminants which leak therethrough.

BACKGROUND OF THE INVENTION

Manhole risers, manhole chimneys, all generically describe the top of the unit which extends from sewer pipes to the ground surface. In particular, the top portion of the manhole riser comprises numerous cement adjusting rings, which sit atop each other and typically have specific dimensions. Each ring may be added to increase the height that the manhole riser extends to. As a road is repaved and new layers of pavement are added, it often times is necessary to add an additional ring such that the manhole covers stay flush with the road.

Catch basins are situated below storm sewer drainage grates found on roads. The storm sewer grates are collection sites for water drainage from streets which flow through catch basins. Catch basins generally comprise a series of rectangular cement rails or collars. The cement collars are stacked in a manner to create a rectangular "basin" through which water passes. Each collar of the basin generally comprises two three-sided cement rails which, when fitted together, create a rectangle. The catch basins extend up to the grate, through which drainage water passes.

A problem that has existed with manhole risers and catch basins in the past is surface and interior water or gasses pass through gaps and spaces in the cement rings and cement collars. Further, the water will often times freeze between and within the cement structures, and the freeze/thaw cycle will deteriorate and break up the cement structures, requiring them to be replaced.

Installation, repair or replacement of sanitary/storm manhole risers, storm catch basins, and storm sewer pipes is a continuous process in maintaining the infrastructure of municipalities. In this process, a special skill called "adjustment" or "adjusting" occurs. Adjustment/adjusting is a process whereby the manhole riser or storm catch basin is adjusted to the height of the road surface.

As water utilities are installed, a manhole for access to the infrastructure system is constructed according to engineering plans on a straight line. If the road has a curve, it requires more manholes than a straight road. The bottom section of the manhole utility access is called a barrel, and between the barrel and riser is the "cone". The cone is made of pre-cast concrete and will not leak because it is one piece. After the cone is placed in position, the adjustment process begins at the top of the cone in order to cause the manhole riser necking to meet flush with the road surface. By using concrete adjusting rings and mixed Portland cement on top of the cone, rings are stacked to bring the manhole and top casting to the road elevation. The procedure is similar for storm catch basins.

Poor workmanship, poor cement, improper grouting, and the freeze/thaw cycle will cause hairline cracks in the adjustment necking. If a crack develops in the asphalt, water seeks its lowest level and begins to work against the cracks. Soon thereafter, the cracks enlarge and water, dirt and other debris begin to seep into the infrastructure.

A further problem occurs at the road surface around manhole risers and catch basins. When leaks develop, the soil erodes, and the erosion causes the ground to sink. This ground sinking action then causes the catch basin or manholes to protrude, and the road needs to be repaired. This loss of supporting material causes the road to collapse around the resultant voids.

Previously, contractors practicing the adjusting process for utilities and municipalities have not had an economical solution for the above problems. One solution, a "filter blanket", has been used in the past. The filter blanket is a geo-textile fabric material that is placed on new roads that have poor underlying soils. The filter blanket gives strength to the road surface. Often times, a contractor will simply cut off a piece of the filter blanket and wrap around the manhole neck to help prevent sand and dirt from passing into the manhole. However, the filter blanket is not adequate for the prevention of water to pass into the adjustment rings.

Additional problems result from water and gas attacking the structures from the inside. For a variety of reasons, water and other liquids attack the interior of the rings and the cement which secure the rings and casting. Sewer gasses such as hydrogen sulfide are particularly corrosive, thus there is a need for an inner seal as well.

These problems are described in U.S. Pat. Nos. 4,475,845 and 4,469,467. These patents describe the problems of water infiltration into manhole chimney seals, and attempt to provide a solution. However, the problem with the solutions proposed in the '845 and '467 patents has not been satisfactory to date, due to the high cost of the product. The '845 patent discloses a chimney seal having numerous sealing sections and a securing means for the chimney seal. In particular, the sealing means describes a retaining band to be used with different preformed skirts. The '467 patent discloses a similar apparatus. The products allegedly covered by these patents are very expensive, and not feasible for widespread use as manhole riser sealer systems. Due to the numerous numbers of manholes which exist and the increasingly tight budgets of municipalities, there exists a need for an inexpensive apparatus and method of sealing, which does not employ the use of "preformed" rings.

U.S. Pat. Nos. 4,540,310, 4,737,220 and Canadian Patent No. 1,142,009 all claim to have some type of sealing means which could be used for sealing water from manhole risers. However, none of these patents address the problems associated with a need for a low cost product and a method for sealing. The present invention addresses such a need, and is disclosed herein. Further, the above patents and existing solutions are directed to manhole risers, and do not address the needs addressed in the catch basin market.

It is the object of this invention to create a barrier which may be placed over adjustment necks of manhole risers and catch basins in a manner of minutes with a one person operation.

It is the object of this invention to have an economical, cost effective method, in dealing with water leaks and deterioration of adjustment necks and catch basins. The present invention eliminates contaminated water, sand, dirt and other debris from penetrating into water system infrastructures, and thereby eliminates or reduces the amount of water treatment needed at the city water treatment plant.

It is the object of this invention to provide an economical method of sealing the intersection between two adjoining pipes.

It is the object of this invention to provide an inner seal for manhole risers and catch basins such that cracks and leakage do not occur from the inside due to exposure to sewer water and gasses.

The present invention also reduces the amount of ground erosion associated with cracks and leakage caused by cracks in manhole risers and catch basins.

SUMMARY OF THE INVENTION

The present invention describes and claims an improved method for sealing a manhole riser or catch basin. The invention also describes and claims an improved kit for sealing manhole risers and catch basins. The method of sealing a manhole riser, with adjusting rings, is described as follows:

a. selecting a first and second band of elastomeric material, said first and second band having a total height of at least the height of the manhole riser from the base of the bottom adjusting ring of the manhole riser to the top edge of the top adjusting ring of the manhole riser;

b. placing the first band over the manhole adjustment area and positioning the bottom edge below the adjustment on the cone; and c. placing the second band over the manhole riser, positioning the second band such that it extends over the top edge of the first band and also extends over the top edge of the top adjusting ring.

The present invention also discloses a kit for sealing manhole risers. The kit comprises:

a first and second band of elastomeric material, the first and second band having a total height of at least the height of the manhole riser from one inch below the base of the bottom adjusting manhole riser to the top edge of the top adjusting ring of the manhole riser.

The present invention also addresses sealing catch basins. The method for sealing catch basins comprises the following steps:

a. selecting a first and second band of elastomeric material, the first and second band having a total height of at least the height of the catch basin from the base of the bottom adjusting catch basin ring to the top edge of the top adjusting ring of the catch basin;

b. placing the first band over the catch basin and positioning a bottom edge of the band at the base of the catch basin, a top edge of the first band extending toward the top of the top adjusting collar; and c. if necessary, placing the second band over the catch basin, positioning the second band such that it extends over the top edge of the first band and also extends over the top adjusting ring and into the edge of the catch basin casting.

The present invention also describes a kit for sealing catch basins. The kit comprises:

a first and second band of elastomeric material, the first and second band having a total height of at least the height from one inch below the bottom of the catch basin from the base of the bottom adjusting catch basin ring to the top edge of the top adjusting ring of the catch basin.

In another embodiment, a method to seal pipe intersections and barrel intersections which are sealed together underground to support a cone, comprise a tape having two strips of adhesive applied to one side of the tape. The tape is dispensed, a release liner is peeled off of the adhesive, and the tape is tightly wrapped around the riser, cone or other conduit which needs to be sealed. The ends are overlapped and sealed with a block of mastic.

Another aspect of the present invention is an inner seal for manhole risers and catch basins. The inner seal comprises at least two bands of elastomeric material which are adhered to the inner surface of the catch basin or manhole riser. Preferably, the bands have adhesive already applied to them, with a release tape liner for easy application.

BRIEF DESCRIPTION OF THE DRAWINGS

FIG. 8 is a perspective view of a manhole riser of the present invention with the inner seal in place.

FIG. 9 is a perspective view of a rectangular catch basin of the present invention with the inner seal in place.

FIG. 10 is a perspective view of a circular catch basin of the present invention with the inner seal in place.

FIG. 11 is a top plan view of the preferred lay up of the inner seal in a circular structure.

DETAILED DESCRIPTION OF THE INVENTION

The present invention, although describing manhole risers and catch basins, also is directed to large standard city sewer manholes which are commonly called cones or barrels. Power and phone companies also have underground cones, which are similar to manhole risers. The present invention envisions the method of sealing a manhole riser, a catch basin, a pipe juncture or any large structure with rings or collars secured together. The present invention may also seal the area between the cone and the barrel which often leaks.

Figure 1:
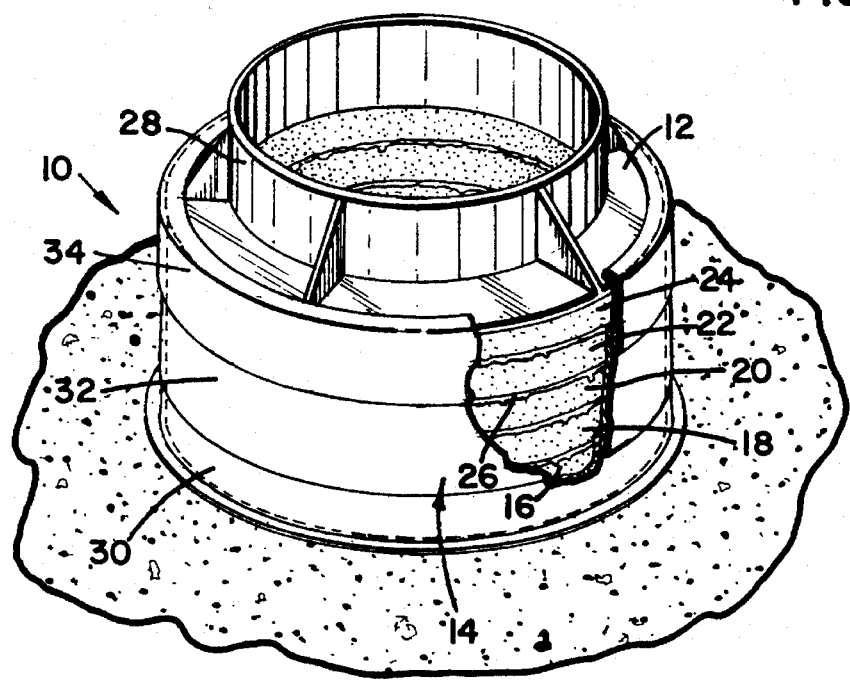
FIG. 1 shows a perspective view of the present invention sealing a manhole riser.

As can be seen in FIG. 1, the present invention is a three-piece sealing system shown generally as 10. The manhole riser is shown as 10, with a break-away as 14. Risers can vary from 4 inches to 16 inches in height depending on the soil and surface conditions. The break-away shows the manhole riser with a portion of the sealing system removed for illustration purposes. The individual adjusting rings 16, 18, 20, 22 and 24 are stacked atop one another. The adjusting rings are generally cemented to one another, with the mortar or Portland cement visible as 26.

For the purposes of the present application, "manhole riser" refers to what is shown in FIG. 1, which comprises a plurality of adjusting rings which lead up to the top casting, which is shown as 12. The casting 12 is an annular collar, which supports the manhole cover (not shown). It is intended that the manhole cover be flush or a bit below the road surface. Beneath the riser 10, is a one-piece cone (not shown). The one-piece cone is typically made of concrete, and need not be shown for the present invention. As discussed above, leaks occur through the adjusting rings, particularly between the adjusting rings, and the present invention discusses a solution to these leaks.

Figure 2:
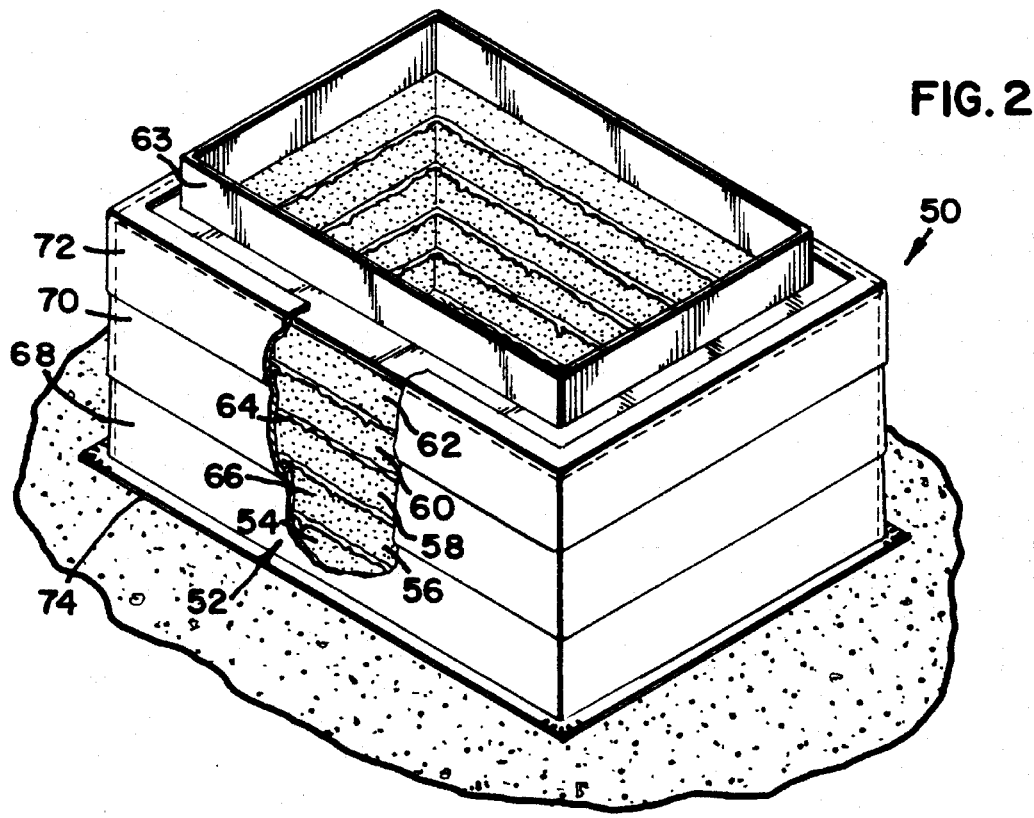
FIG. 2 shows a perspective view of the present invention sealing a catch basin.

FIG. 2 discloses a catch basin generally shown as 50. The catch basin has individual adjusting collars, which are shown at the break-away portion of the sealing system 52 as 54, 56, 58, 60 and 62. A top casting is shown as 63. The collars are secured in place with Portland cement or mortar, shown generally as 64. Generally, two collars are fitted together with a point of intersection shown as 66. It is intended that the casting 63 with a grate on top (not shown) be marginally below the road surface, with the road surface tilted in a manner such that storm water drains into the catch basin 50. Water passes through a grate which appears on top of the casting 63, through the middle of the collars, into the storm sewer system. The storm sewer system typically discharges into areas used as irrigation, lakes, rivers, etc. This is different from manhole risers, which typically are involved in the treatment of water which is thereafter piped to homes and businesses for consumption. Although the manhole riser and catch basin perform different functions, as described above, the same problems apply to both. The mortar or cement holding the rings or collars in place often breaks down with the freeze/thaw cycle or with age. Furthermore, cracks may develop in the rings or adjusting collars, whereby water, sand, and other contaminants may freely pass through the cracks.

The present invention addresses these concerns. Referring back to FIG. 1, there is a three-piece sealing system, with a bottom band being 30, a middle band being 32 and a top band being 34. The bands are large, continuous bands of an elastomeric material, with the ends secured together to form a continuous loop. Preferably, the ends are secured together by a vulcanizing process. The first band 30, is a circular shaped elastomeric band which is adapted to fit the bottom of manhole riser 10. The second band, shown as 32, is placed in the mid region of the manhole riser 10. Preferably, the band is an EPDM elastomeric material (ethylene propylene diene) or Neoprene. EPDM and Neoprene Materials are abrasion resistant, rubber like synthetic polymers. Other types of possible elastomeric materials include, but are not limited to nitrile, Hypalon, thermoplastic materials including, but not limited to, CPE (chlorinated polyethylene) rubbers, block copolymers such as SBS, SIS, Kraton® products and other elastomeric materials.

Figure 3:
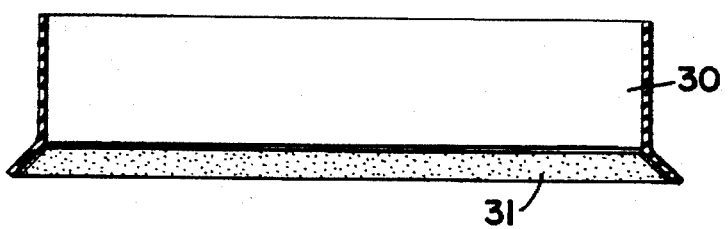
FIG. 3 shows individual components of the kit for sealing a manhole riser.
Figure 4:
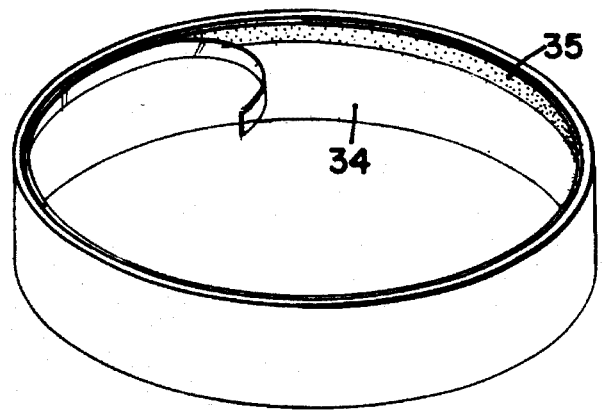
FIG. 4 shows one of the individual components of the kit of FIG. 3.

Preferably some bands of the present invention have a mastic adhesive on at least a portion the interior of the band. Preferably, a release liner covers the exterior of the adhesive. Once the bands are in place, the release liner is removed. The adhesive thereafter secures the band to the riser. FIGS. 3 and 4 disclose the use of an adhesive on the bands. FIG. 3 shows the preferable adhesive positioning. Another preferred adhesive position is to have an adhesive on the top and bottom of the interior of the bands with no adhesive in the middle portion of the band. The top band 34 has adhesive on about the top half of the band. Band 32, preferably, has no need for adhesive as it is secured by the overlapping of bands 34 and 30, preferably, bottom flange portion 36 has adhesive thereon.

The first band 30 is drawn over the adjustment neck to the bottom of riser 10. If a slab is involved, the band will automatically flair out and adhere to the slab catch basin. This "flair" is especially preferred if the cone is sitting on a cement slab. The "flair" flares out to meet the cement slab. Preferably, the bottom band extends partially below the base of the bottom adjusting ring (about one inch).

In the preferred embodiment, the top band 34 terminates at the top of the top adjusting ring 24 on the bottom edge of the casting 12. Preferably, band 34 has an approximate height of 6 inches and is of an elastomeric material that stretches over the top edge of the top adjusting ring 24 to the bottom edge of the casting 28 to create a tight seal. The entire structure is now water tight.

Thus, to summarize the method, prior to installing the invention, remove all dirt from around the base of the riser or basin. Clean the riser or basin so it will receive the adhesive. Smooth all sharp corners with an abrasive stone. Wipe clean with a rag. A first ring of material 30 is pulled over the manhole riser 10, and pulled down to the bottom. The top of the first band must reach the top of the top adjusting ring. If the bottom band does not reach the top adjusting ring, and extension band must be used. Preferably, adhesive is previously applied to the inside, and a release liner is pulled off the band 30. A second band 32 is pulled over riser 10 and positioned to overlap riser 10 by approximately 2 inches. After the second band 32 is in place, the third, smaller top band 34 is put in place after adhesive is applied or exposed from the inside of band 34. This extends below the top portion of the second band 32, and extends over the top portion of the top adjusting ring, and extends onto the casting 28. Preferably, this third band is approximately a 6 inch band. However, the present method and kit may work if the top band reaches from a mid point region measured from the base of the riser to the top edge of top adjusting ring. Thus, the actual size of the bands is not important, with the criteria that the bands cover the whole exterior of the manhole riser.

Optionally, the middle third band may or may not be needed, depending on the number of adjusting rings used. Regardless of whether there are two bands or three bands, the system is sealed in place with adhesive, mortar and the manhole riser is thereafter buried.

Catch basin 50, shown in FIG. 2, utilizes a band system whereby the bands are rectangular in shape. The first band 68 is placed over the catch basin such that it is pulled to the base of the catch basin 50. The bottom band 68 is cut about ½ inch on 3 inches either side of the corner to relieve tensions. Flange 74 thereafter contacts the slab, allowing water to run-off. Top band 22 is thereafter placed on top of the catch basin 50. The bottom edge of the top band 72 is positioned below the top edge of the second rectangular band 70. The top edge of the third band 72 thereafter extends beyond the top edge of the top adjusting collar 62, and extends on to the bottom edge of the casting 63. Thereafter, catch basin is sealed and buried.

The circular bands used for the manhole riser and the rectangular bands used for the catch basin of the present invention are elastomeric material, which is generally cut from a pattern and is made into a band from a rectangular cut piece of material with the use of a vulcanizing process to secure the band. The same procedure is performed with the rectangular band.

FIG. 3 shows a preferred "kit" of bands for the catch basin and the manhole riser of the present invention. As is evident, the top band has an adhesive portion 35 at the top. This is so the top band is secure to the top collar and/or casting of the catch basin. The kit includes an extension band 32 and the bottom band 30, which has an adhesive portion 31 on the bottom portion.

FIG. 4 shows a perspective view of the inside of band 34 of the present invention.

Figure 5:
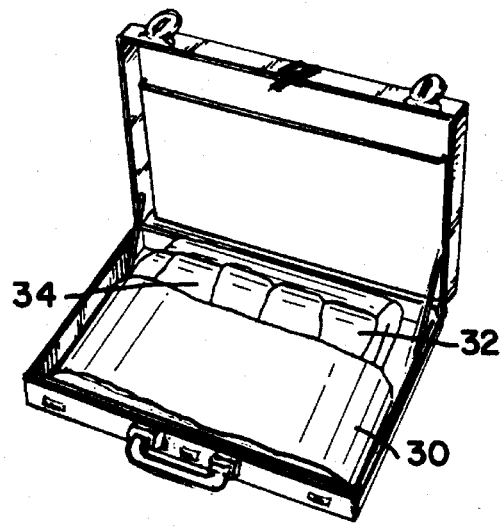
FIG. 5 shows the kit in boxed form.

FIG. 5 shows a complete kit of the present invention, with bands 30, 32 and 34.

In the preferred embodiment, the bottom band is 12 inches high and has is capable of being flaired if a slab is involved. All of the bands have a thickness of about 0.06 inches and have a 60 durometer. Adhesive is applied to the interior surface. The top band lays on the casting to seal against infiltration. The vertical part of the top band fits over the top portion of the bottom or middle band and should overlap at least 2 inches. An extension band with a height of approximately 8 inches may be used to gain additional height as described above. The extension piece fits over the bottom piece and should preferably overlap by at least 2 inches. The top piece will thereafter fit over the extension band, which overlaps by at least about 2 inches over the extension band.

Preferably the extension band should have an adhesive or strip of mastic on the bottom edge, where the bottom of the extension band contacts the top of the bottom band. Thus, the extension band would have adhesive on the bottom, inner surface which contacts the top, outside surface of the bottom band. This ensures the integrity of the seal. Likewise, the top band should have adhesive or mastic which is on the interior surface, and contacts the top, outer surface of the extension band. Again, this ensures the integrity of the seal. The sealant used as an adhesive for the bands is a flexible butyl mastic sealant. Preferably, the adhesive is a nonhardening butyl rubber mastic, commercially available from BIDCO Adhesives.

It has also been found that the addition of a primer to the portion of the concrete or casting that the sealant will contact provides for an enhanced adhesive bond between the bands and the cement or casting. Typically, the primer is applied in the field, via a spray can or brush, to the intended surface (concrete rings, mortar, casting, etc.) prior to the mastic containing band being applied. As the primer reacts with the sealant, there is no need to apply the primer anywhere other than where the sealant contacts. Preferably, the primer is a solvent based primer of synthetic rubber and resin. The preferred primer is a heptane based primer commercially available from Bondline Adhesives Inc. Other primers are envisioned, with the only requirement being an enhancing of the adhesion between the band and the structure. Preferably, the primer dries quickly (meaning quick evaporation of the solvent) such that the band with the sealant may be applied without undue waiting.

It is also useful to seal the interior of the manhole riser or catch basin. This is shown in FIGS. 8, 9, 10 and 11. Oftentimes water, other liquids and gasses contact the inner surface of the riser or basin, with the result being the joints are corroded or deteriorated over time. Thus, an inner seal is advantageous to prevent the joint destruction from the interior.

In accordance with the present invention, an inner seal invention comprises a band with an adhesive. Preferably, the mastic covers the entire surface which will contact the inner riser or basin surface. The band preferably is EPDM but can be other materials as described above. The adhesive is preferably the same as described above.

FIG. 8 discloses a circular manhole riser 100 with the outer seal denoted as 102. The casting rings are shown in a break away as 104 and 110. The casting sits atop the riser, denoted as 106. The inner seal 108 is shown with an overlap portion 112. The overlap portion is approximately 1 inch, and extends all the way down to the interior base of riser 100. As is evident in FIG. 8, the preferred embodiment is to have the inner seal 108 extend up to the casting, and preferably, approximately 2 inches onto the casting 106. Unlike the preferred embodiment of the outer seal shown above, the inner seal preferably has adhesive coated on the full surface which contacts the interior 110 of structure 100. Most preferably, a primer, as described above, is first applied to the interior surface 110. Thereafter, the band, preferably being EPDM, has an adhesive such as butyl mastic coated on one entire surface, with a release liner covering the adhesive. If the width of the band is not approximately the interior height of the riser, with allowing an overlap onto the casting, either the band is cut to an appropriate width, or if the band is not wide enough, two or more bands may be applied. The band(s) are applied such that an edge 112 is placed on the interior 110, such that edge 112 is in a vertical position. The band 108 thereafter is pushed against the interior 110 all the way around the interior 110, until there is a partial overlap at edge 112. The top and bottom horizontal edges of the band, during the installation process, should be aligned or substantially parallel with the horizontal plane defined as the top and bottom of riser 100. In other words, the band should be positioned to cover as much interior space as possible. The band 108 is thereafter cut, either before or after the previously described process. In other words, the band 108 may be cut to the appropriate length either before or after it is applied on the interior 110.

An alternative method and a preferred method of applying the inner seal in a circular structure is shown in FIG. 11. In this method, the inner seal is cut into strips 144 and 146 having a length of approximately the interior height of manhole riser 100. A plurality of vertical strips are cut, and applied in a vertical direction, rather than a horizontal direction. Again, there is a partial overlap 145 as shown between strips 144 and 146. This method is preferred due to the fact that often times the interior is askew, thus making it difficult to apply the band in a square fashion. Thus, several short bands may be cut and applied in the vertical fashion described above.

FIG. 9 discloses a square catch basin 120 showing an outer seal 122 and inner seal 130 of the present invention. Grate 128 sits atop casting 126. The inner seal 130 rises up to a point 132, such that when water flows into grate 128, at a high flow rate, it does not catch an edge of inner seal 130 and shear off 130 from the interior. Thus, it is preferred to extend inner seal 130 as high as possible in the back of casting 126. This is also shown in FIG. 10, whereby an additional inner seal 136 is shown being added to a circular catch basin 130. The casting 132 is shown with a band 134 having an overlap 138.

Figure 6:
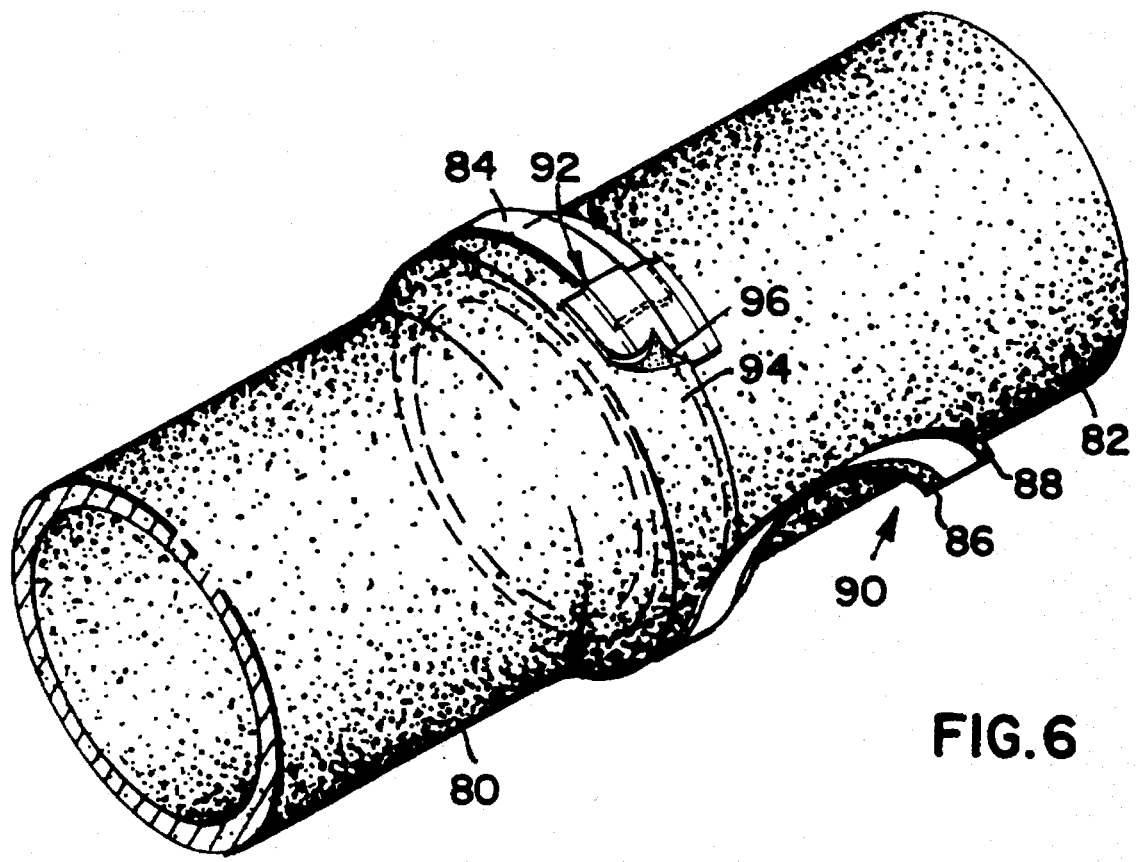
FIG. 6 shows components of the present invention used in a method to seal pipe junctures.
Figure 7:
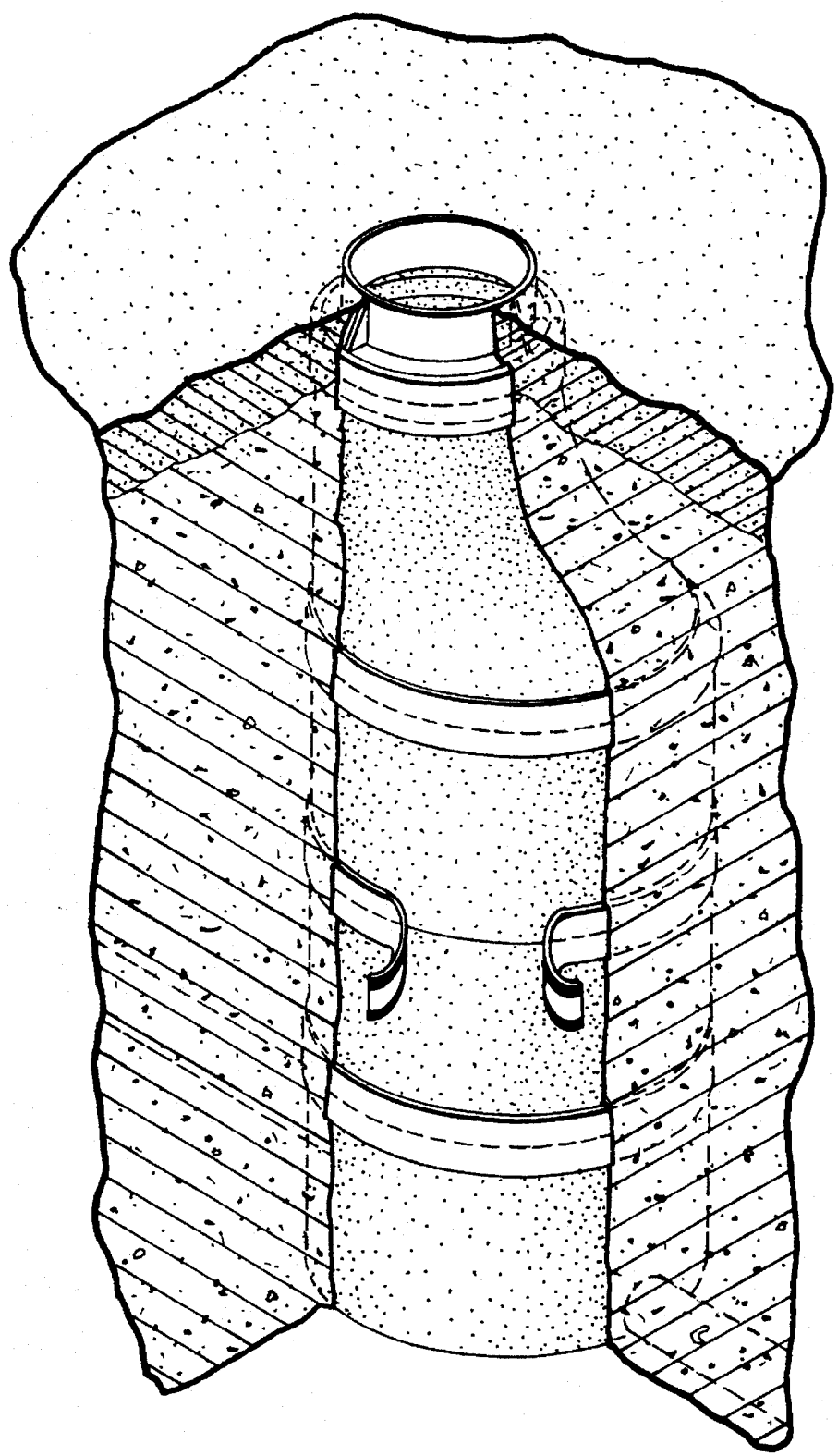
FIG. 7 shows components of the present invention used to seal barrels supporting a cone.

The present invention also provides an economical method of sealing the area around a pipe juncture. As shown in FIG. 6, pipes 80 and 82, which may be cement pipes, are often connected together with a "male" 82 and "female" 80 pipe. The male pipe 82 is inserted into an enlarged, female end of another pipe 80. The tape or connector has adhesive sections 86, and 88 and has two ends 90, and 92.

However, often times the juncture 94 or intersection formed by these pipes is not water tight or impervious to infiltration. The present invention addresses these problems with the use of a tape system.

As is shown in FIG. 6, a pull away of the tape 92 is illustrated. The method of sealing the pipe juncture utilizes a roll of elastomeric tape. The tape 92 preferably comes in a dispenser (not shown), with the tape being 50 feet long, rolled in the dispenser box, and the tape 92 is made of EPDM and is 8 inches wide and 0.60 inches thick. The tape 92 has mastic on the top and bottom of the tape 92 running lengthwise. The mastic preferably is 1.5 inches×0.25 inches thick. Preferably it is the same mastic as described above.

The method involved having two pipes which are configured as shown in FIG. 6 is described below. A section of elastomeric tape is cut, with the stretched length of the tape being greater than the circumference of the pipe juncture that the tape is covering.

The tape has previously applied to it at least two strips of adhesive extending lengthwise along the tape. The tape is positioned such that about one-half of the width of the tape is on one side of the pipe juncture and the remaining half of the tape is on the other side of the pipe juncture. The tape is pulled tightly, and wrapped around the juncture, such that there is a portion of a first end of the tape extending over the second end of the tape.

Either prior to, or after the tape has been pulled tightly around the pipe juncture, a connector 96 is attached to one end of the tape. The connector 96 is preferably a square of mastic, with a release liner. As shown in FIG. 6, the connector 96 acts as a splice for the two ends 90 and 92 of tape 84. The mastic may be double sided or single sided and may be attached in numerous ways. It can be attached to tape 84 prior to wrapping around the pipe juncture 94, or it can be placed on the pipe juncture after the tape 84 is wrapped around the pipe juncture 96.

In addition to pipe junctions, the tape system may be applied to barrels which support the cone. In this other embodiment, a method to seal the joint where a manhole barrel and cone are joined. This is comprised of a band of predetermined size elastomeric material. The band has two strips of mastic on the outside edges of one side. The band is pulled into place over the joint, the release paper on the mastic is removed and pressed into panels.

Although the present invention has been described with reference to preferred embodiments, workers skilled in the will recognize that changes may be made in form and detail without departing from the spirit and scope of the invention.

What I claim is:

1. A method for sealing the interior of a structure selected from the group consisting of a manhole riser or catch basin, said method comprising the steps of:
   a. selecting a first band of elastomeric material, said first band having a total width of at least about the height of the interior of the structure and a total length of at least about the interior circumference of said interior of said structure, said first band having an adhesive coated on substantially the entire inner face which contacts said structure interior;
   b. placing a vertical edge of said first band in position on said interior such that horizontal edges of said band are substantially aligned with a first and second horizontal edge of said structure; and
   c. rolling said band around said interior until said interior is substantially covered with said first band.

2. The method of claim 1 wherein said first band comprises EPDM.

3. The method of claim 1 wherein said band is precut in length to fit around said interior with an overlap.

4. The method of claim 1 wherein said adhesive is a butyl mastic adhesive.

5. The method of claim 1 having an additional step of applying at least one more band to said interior.

6. The method of claim 1 comprising the additional step of applying a primer to surface areas of said structure interior which will contact said adhesive.

7. A method for sealing the interior of a structure selected from the group consisting of a manhole riser or catch basin, said method comprising the steps of:
   a. placing a vertical edge of a first band of elastomeric material in position on the interior of the structure such that horizontal edges of said band are substantially aligned with a first and second horizontal edge of said structure, and such that said vertical edge is secured to the interior by an adhesive disposed therebetween; and
   b. starting proximate said vertical edge, rolling said band around said interior until said interior is substantially covered with said first band and said first band is secured to the interior by an adhesive disposed therebetween.

8. The method of claim 7 wherein said first band comprises EPDM.

9. The method of claim 7 wherein said band is precut in length to fit around said interior with an overlap.

10. The method of claim 7 wherein said adhesive is a butyl mastic adhesive.

11. The method of claim 7 having an additional step of applying at least one more band to said interior.

12. The method of claim 7 comprising the additional step of applying a primer to surface areas of said structure interior which will contact said adhesive.

13. The method of claim 7 wherein said first band has a total width of at least about the height of the interior of the structure and a total length of at least about the interior circumference of said interior of said structure.

* * * * *